Nov. 26, 1968   A. J. BENNETT   3,412,437
SNAP-ACTION FASTENING DEVICES
Filed Oct. 27, 1965

INVENTOR
ALAN JAMES BENNETT
BY
Pearse Pedger & Pearse
ATTORNEY

United States Patent Office 3,412,437
Patented Nov. 26, 1968

3,412,437
SNAP-ACTION FASTENING DEVICES
Alan James Bennett, Pontypridd, Wales, assignor, by mesne assignments, to Tinnerman Products, Inc., Cleveland, Ohio, a corporation of Ohio
Filed Oct. 27, 1965, Ser. No. 505,387
Claims priority, application Great Britain, Oct. 29, 1964, 44,097/64
19 Claims. (Cl. 24—73)

ABSTRACT OF THE DISCLOSURE

A snap-action fastener including a head portion and root portion, the root portion being adapted to flex inwardly of itself as it passes through a hole in a panel and to return to its original condition with a snap-action after a certain portion of the root has passed through the hole for securing the fastener to the panel.

---

This invention relates to fastening devices of the type comprising a head portion and a root portion, the root portion being adapted to flex as it is pressed through a hole in a panel and to expand with a snap action after a certain part of the root has passed through the hole, thus securing the fastening device in the panel. Such a fastening device is referred to hereinafter as "of the type described."

According to the present invention there is provided a fastening device of the type described wherein the root portion has an opening therein and includes a detent formed integrally therewith and disposed opposite said opening, said detent being movable, by flexure of the material forming the root portion, into and out of said opening in response to the root portion being driven into a hole in a panel.

The present invention also provides a fastening device of the type described wherein the root portion comprises two spaced legs integral with and dependent from the head portion, a bridge portion integral with and extending between the ends of said legs remote from the head portion, and a detent extending from said bridge portion toward the head portion, said detent being disposed, at least partly outside the space between the legs but being capable of movement toward and away from said space by flexure of at least one of the parts of said root portion.

The present invention further provides a fastening device of the type described wherein the root portion comprises two legs dependent from said head portion and having mutually-facing flat surfaces parallel spaced from one another, and a detent lying between the planes containing said surfaces and movable into and out of the space between the legs, the detent being mounted on a bridge portion integral with the outer ends of the legs, the outer face of the detent being inclined away from said legs in a direction away from the bridge portion, the material forming the root being sufficiently flexible to permit the detent to swing partially into said space as the device is driven into a hole in a panel.

Three forms of fastening device in accordance with the invention will now be particularly described, by way of example, with reference to the accompanying drawing in which.

Figure 1:
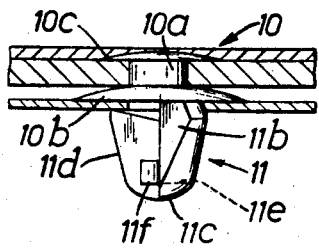
FIGS. 1 and 2 are side views taken in mutually perpendicular directions showing one form of the fastening device in position in a panel.
Figure 2:
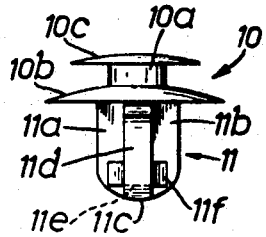
Figure 3:
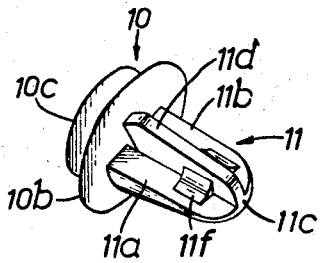
FIG. 3 is a perspective view of the device of FIGS. 1 and 2.

As shown in FIGS. 1 to 3, the fastening device comprises a head portion 10 and a root portion 11, the latter being designed to effect the snap action. The head portion is in the form of a short stem 10a having a flange 10b, 10c at each end thereof, the appearance being similar to that of a collar stud. The larger of the two flanges, which will be referred to as the base flange 10b, is dished on its surface remote from the stem, and the root portion extends perpendicularly away from the dished surface of this flange so that it is colinear with the stem.

The root portion of the fastening device, which tapers in a direction away from the head portion, is formed by two parallel spaced legs 11a, 11b, integral at their inner ends with the base flange and coupled together at their outer end by an integral bridge portion 11c, and a detent 11d which is integral with the bridge portion. This detent extends from said bridge portion towards the base flange, terminating just short of the base flange.

The mutually facing surfaces of the two legs define between them an elongated slot closed at its opposite ends by the base flange and the bridge portion. The slot is not fully visible in the drawings, since it lies directly behind the leg 11b in FIG. 1 and behind the detent 11d in FIG. 2, but the top of the slot is visible above the detent in FIG. 2 and the bottom of the slot is indicated by dotted line 11e in both figures. The detent has a thickness which permits it to fit into the slot, if pressed laterally, by pivotal movement. This pivotal movement is permitted by resilient bending, in particular of the junction between the detent and bridge portion, but the bending may extend into the detent and the legs. This is particularly so when strengthening fillets 11f are provided, as shown, between the detent and the legs at a position spaced from the ends of the legs.

The shape of each leg and of the detent, as seen in the direction of the axis of pivotal movement of the detent, is approximately that of an elongated right-angled triangle, the hypotenuse of the triangular shape of the detent forming one of the tapering sides of the root portion and the hypotenuse of the triangular shape of each leg forming the opposite tapering side of the root portion. It will be seen that the legs and the detent lie substantially wholly on opposite sides of an axial plane of the root portion, this plane containing the basis of the triangular shapes.

In the unstressed state of the fastening device, the detent lies just outside the slot defined between the legs of the root portion. However, as the root portion is pressed into a hole in a panel 12, the tapering sides of the root portion, containing the outer edge of the detent and the outer edges of the legs respectively, engage the sides of the hole and progressive movement of the root portion into the hole causes the detent to pivot into the slot between the legs. When the root portion has entered into the hole, until the base flange engages the panel, further movement causes the dished base flange to be flattened resiliently against the panel and causes the inner end of the detent to clear the panel, whereupon it springs out of the recess into overlapping relationship with the rear face of the panel. This is assisted by forming the terminal portion of the detent and of the legs adjacent the head portion with a reverse taper.

In this position, the detent locks the fastening device in the panel, and the base flange, being resiliently distorted from its normal dished shape, holds the detent tightly against the rear face of the panel.

The fastening device of FIGS. 1 to 3 is particularly designed for securing casings or trims to car door panels. The device can be made to provide a non-corrosive water-tight seal and to be removable many times without damage to the fastener or the trim.

Figure 4:
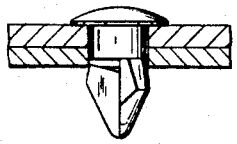
FIGS. 4, 5 and 6 are views corresponding to those of FIGS. 1–3 of a second form of fastening device.
Figure 5:
Figure 6:
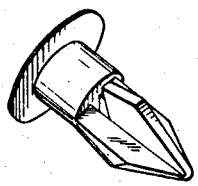

The second form of fastening deivce shown in FIGS. 4–6 is designed as a snap-in rivet for securing together two flat parts, such as a metal strip to a panel. Its main difference from the first described form lies in the shape of the head portion from which the base flange has been omitted, the stem and head flange being enlarged.

Figure 7:
FIG. 7 is a side view of a third form of fastening device.

The third form of fastening device, shown in FIG. 7, is a modification of the form shown in FIGS. 1–3 in which the base flange has been reduced in size and made more rigid, whereas the head flange is enlarged relative to the root portion and made more rigid.

Although specific shapes of the head and root portions of the fastening device have been referred to, it will be evident that these have been given merely by way of example. In particular, the head of fastening device may take any one of a large number of shapes dependent upon the function which it is designed to perform. For example, the smaller flange of the head may be omitted and the stem may be provided with an integral hook, or may be internally or externally screw-threaded to receive a nut or bolt or other screw-threaded attachment.

The whole fastening device is conveniently formed in one piece from nylon or other plastics material by moulding.

What is claimed is:

1. A fastening device comprising, a head portion and a root portion extending from said head portion, said root portion including two legs having mutually-facing flat generally parallel surfaces spaced apart from one another, a detent disposed between the planes containing said surfaces and movable into and out of the space between said legs, said detent mounted on a bridge portion integral with the ends of said legs remote from said head, said detent having an outer face inclined away from said legs in a direction away from the bridge portion, the material forming the bridge portion being sufficiently flexible to permit the detent to move partially into said space between said legs as the fastener is driven into a hole in a panel, and said detent being further secured to said legs by fillets spaced from the ends of said legs remote from said head.

2. A device according to claim 1 wherein said legs lie wholly on one side of an axial plane of the root portion and the detent lies wholly on the opposite side of said plane.

3. A device according to claim 1, wherein both of said legs and said detent have outer edges extending away from said bridge portion in a direction inclined away from an axial plane of said root portion.

4. A device according to claim 1, wherein terminal portions of said outer edges adjacent the head portion are inclined toward an axial plane of said root portion.

5. A device according to claim 4 wherein the size of the detent is substantially equal to that of the space between the legs.

6. A device according to claim 5 wherein the head portion comprises a flange which is flexible and dished on its side adjacent the root portion.

7. A device according to claim 6 which has been moulded in one piece from synthetic resin plastic material.

8. A fastener according to claim 1, wherein said head includes a base flange portion, an upper flange portion disposed generally parallel to said base flange portion and a stem member extending between said upper and base flange portions for supporting said flange portions in spaced apart relation, said legs project and extend generally perpendicular from said base flange.

9. A fastener in accordance with claim 8 wherein said flange portions and said stem are generally circular in configuration.

10. A fastener in accordance with claim 1, wherein said detent extends from said bridge portion in a direction toward said head terminating in an upper end slightly short of said head to enable movement of said upper end with respect to said head.

11. A fastener in accordance with claim 10, wherein the upper end of said detent is spaced apart from said head a distance sufficient to enable the insertion of panel therebetween, and enable the upper end of the detent to overlap the under surface of said panel when in the inserted position.

12. A fastener in accordance with claim 1, wherein the outer face of each of said legs is inclined in a direction away from said detent, and said bridge portion and is adapted to engage an edge of the hole in said panel.

13. A fastener in accordance with claim 1, wherein said legs are generally triangular in shape in side elevation thereof.

14. A fastening device comprising, a head portion and a root portion extending from said head portion, said root portion including two legs having mutually-facing, generally parallel surfaces spaced apart from one another, a detent disposed between the planes containing said surfaces, said detent mounted on a flexible bridge portion made integral with the ends of said legs and the lower end of said detent remote from said head, said detent adapted to pivot in a generally vertical plane about said bridge portion and into the space between said mutually-facing surfaces, said detent having an upper surface inclined away from said legs in a direction toward said head, said inclined surface adapted to engage the edge of a hole in a panel upon insertion of said device into said hole for causing said detent to rotate about said bridge portion into a space between said legs in a direction generally parallel to the plane of said mutually-facing surfaces, said detent having an upper terminal end spaced apart from said head a sufficient distance to enable the insertion of a panel therebetween, and said upper edge adapted to overlap the confronting surface of said panel when in the inserted position of said device.

15. A fastening device in accordance with claim 14, wherein said detent includes two generally parallel side surfaces extending from said bridge portion to said upper edge as seen in a direction facing said outer inclined surface.

16. A fastening device in accordance with claim 15, wherein said detent is connected to said bridge portion so as to move into the space between said mutually-facing surfaces in a direction generally parallel to said side surfaces.

17. A fastening device in accordance with claim 14, wherein said legs and detent are of a generally triangular shape in side elevation tapering downwardly in a direction toward said bridge portion, and the vertical plane of said detent being disposed generally parallel to vertical planes each containing the mutually-facing surfaces of said legs.

18. A fastening device in accordance with claim 14, wherein the upper ends of said legs and said detent include tapered portions extending downwardly and outwardly away from said head.

19. A fastening device adapted for insertion in an apertured support member comprising, a head portion and a root portion extending from said head portion, said root portion including a pair of legs having mutually-facing, generally parallel surfaces spaced apart from one another, a detent disposed between the planes containing said surfaces, said legs and said detent being substantially coextensive in axial extent measured in a direction toward said head portion, a flexible bridge member connecting the ends of said legs together and said detent to said legs, said bridge and detent members and said legs being of substantially an integral, unitary construction at said bridge member, said legs disposed substantially on one side of an axial plane of the root portion and said detent disposed substantially on the opposite side of said plane, said detent adapted for pivotal movement in a generally vertical plane about said bridge portion and into the space between said mutually-facing surfaces upon engagement of an outer surface of said detent with the edge of the aperture in said support member upon insertion of said device therein.

References Cited

UNITED STATES PATENTS

| | | | |
|---|---|---|---|
| 3,186,049 | 6/1965 | Fiddler | 24—73 |
| 2,223,622 | 12/1940 | Kost | 24—73 |
| 3,093,874 | 6/1963 | Rapata | 24—73 |
| 3,249,973 | 5/1966 | Seckerson | 24—73 |

FOREIGN PATENTS 937,220   9/1963   Great Britain.

DONALD A. GRIFFIN, *Primary Examiner.*